(12) United States Patent
Bechhoefer (10) Patent No.: US 9,823,345 B2
(45) Date of Patent: Nov. 21, 2017

(54) SYSTEM AND METHOD FOR DETERMINING HELICOPTER ROTOR BLADE PERFORMANCE

(71) Applicant: Eric Robert Bechhoefer, Cornwall, VT (US)

(72) Inventor: Eric Robert Bechhoefer, Cornwall, VT (US)

(73) Assignee: Green Power Monitoring Systems, LLC, Cornwall, VT (US)

( * ) Notice: Subject to any disclaimer, the term of this patent is extended or adjusted under 35 U.S.C. 154(b) by 634 days.

(21) Appl. No.: 14/695,014

(22) Filed: Apr. 23, 2015

(65) Prior Publication Data

US 2015/0355325 A1    Dec. 10, 2015

Related U.S. Application Data

(60) Provisional application No. 61/983,503, filed on Apr. 24, 2014.

(51) Int. Cl.

| G01S 13/88 | (2006.01) |
|---|---|
| G01S 13/08 | (2006.01) |
| G01S 13/50 | (2006.01) |
| G01S 7/40 | (2006.01) |
| B64C 27/00 | (2006.01) |
| G01S 13/00 | (2006.01) |

(52) U.S. Cl.
CPC ............ *G01S 13/88* (2013.01); *B64C 27/006* (2013.01); *B64C 27/008* (2013.01); *G01S 7/40* (2013.01); *G01S 13/08* (2013.01); *G01S 13/50* (2013.01)

(58) Field of Classification Search
CPC .......... G01S 13/88; G01S 13/50; G01S 13/08; B64C 27/006; B64C 27/007; B64C 27/008
See application file for complete search history.

(56) References Cited

U.S. PATENT DOCUMENTS 3,985,318 A * 10/1976 Dominey et al. ..... B64C 27/007
6,448,924 B1 * 9/2002 Hafer, Jr. ............. B64C 27/008

* cited by examiner

*Primary Examiner* — Bernarr E Gregory
(74) *Attorney, Agent, or Firm* — Justin W. McCabe; Dunkiel Saunders Elliott Raubvogel & Hand PLLC (57) ABSTRACT

A helicopter rotor blade performance system (BPS) allows for accurate determination of blade track height and blade track phase while reducing size, weight, and complexity of the system. The BPS uses sensing technology that is scalable to adapt to a variety of helicopters and is readily and unobtrusively installed. The BPS includes a bused smart system methodology that can directly measure track height, while phase can be estimated using the time synchronous average of the magnitude or range of the return signal from a radar wave. The BPS includes a rotation monitor, radar tracker, and control unit, that allows for a determination of the track errors and consequentially whether a track rebalancing should occur.

20 Claims, 6 Drawing Sheets

SYSTEM AND METHOD FOR DETERMINING HELICOPTER ROTOR BLADE PERFORMANCE

RELATED APPLICATION DATA

This application claims the benefit of U.S. Provisional Application Ser. No. 61/983,503, filed Apr. 24, 2014, entitled "System and Method for Determining Helicopter Rotor Blade Performance" which is hereby incorporated by reference herein in its entirety.

FIELD OF THE INVENTION

The present invention generally relates to helicopter monitoring systems. In particular, the present invention is directed to a System and Method for Determining Helicopter Rotor Blade Performance.

BACKGROUND

Figure 1:
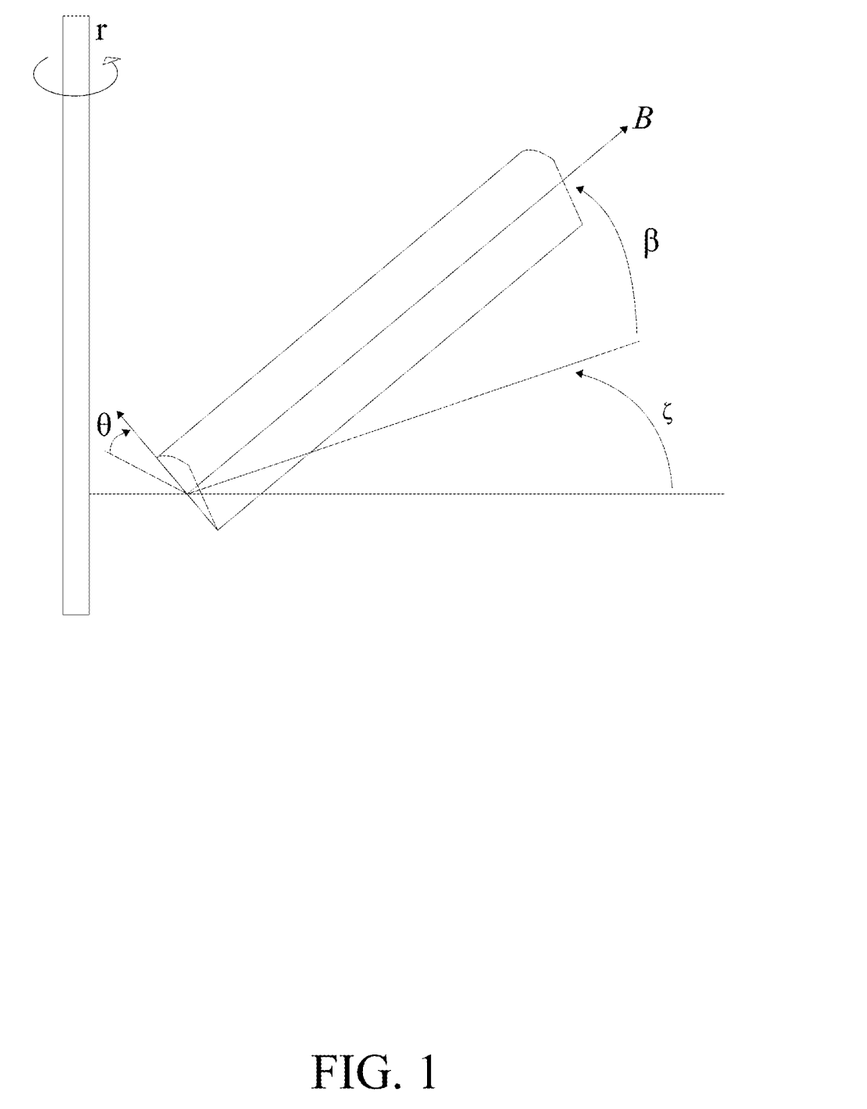
FIG. 1 is a diagram of blade motion and coordinates for a generic helicopter rotor blade.

A helicopter includes a plurality of rotor blades that are coupled to, rotate with, and transfer loads to, a hub. Each rotor blade rotates with a constant angular rate $\Omega$, with the root of the blade attached to the hub. With reference to FIG. 1, there is shown a simplified diagram of a helicopter blade rotating around an axis, r. With the blade position for the $k^{th}$ blade regarded as $\Psi_k$, the motion of the $k^{th}$ blade includes a flapping angle $\beta_k$, a lead-lag angle $\zeta_k$, and a pitch angle $\theta_k$. If elastic deformations are small, then $B_k$ generally determines the blade tip path.

Loads from the blades are transferred to the hub of the helicopter. If the blades are articulated, then moments acting on the hub are theoretically negligible. The force on the hub of the $k^{th}$ blade can be determined using Equation 1, below:

$$F_k^H = X_\alpha \sin(\psi_k) + X_\alpha \cos(\psi_k) \quad \text{Equation 1}$$

Where $X_\alpha$ are the loads along the aircraft's x, y, and z axis and the force due to blade k on the hub is $F_k^H$. In the case of identical blades, the sum of all forces on the hub is determined using Equation 2, below:

$$F^H = \Sigma_{k=0}^{B-1} F_k^H = 0 \quad \text{Equation 2}$$

Of course, identical blades are theoretical, and deviations from a nominal blade will result in a non-zero force, which is measured as vibration (measured, periodic accelerations) in the helicopter and different blade track height (variations in relative blade height).

The relationship between perturbations between blades and the resulting track deviation and vibration is complex. For example, in a simplified hypothetical, where the mass balance of all blades is identical but the flapping angle, $\beta_k$, is different, by adjusting pitch of the $k^{th}$ blade an identical track/flapping angle could be reached for a given helicopter airspeed. However, a change in pitch of that blade would set-off a series of consequences such as, affecting the adjusted blade's lift and drag, which would change the blade's lead/lag, that would in turn change the mass balance of the hub, and ultimately result in accelerations that would increase vibration.

The non-uniformity of the blades results in aerodynamic imbalance, mass imbalance, and track errors. Prior art efforts to decrease the non-uniformity of the blades began as efforts to reduce track split, i.e., the maximum difference in blade track height, errors—resulting in "flat track" (in other words, obtaining a minimum difference in blade track height). While a flat track does not always result in a low vibration helicopter, after a blade change or blade balancing, it is essential that the blade track split be within the manufacture's specifications.

To correct for blade non-uniformities, rotor blades are generally manufactured with devices to purposely induce non-uniformities that produce conditions that can be accounted for and that cancel the effect of the naturally occurring blade errors. These devices can include:

1. Weights (WTS), which are attached at specific locations (e.g., hub and rotor tip) to change the blade moment. Weights do not affect blade track height;
2. Pitch control rod (PCR) setting, which by changing length of the pitch rod, changes the angle of attack of that blade relative to the other blades; and/or
3. Trailing edge tabs (TAB), which effectively change the blade's camber when bent. This in turn affects the aerodynamic loads/moments on the blade.

The acceleration due to blade induced vibration is measured for specific points in the aircraft, such as the Pilot/Copilot vertical acceleration, which can be combined vectorially to derive cockpit vertical (A+B) or cockpit roll (A−B); Cabin Vertical; Cabin Lateral; or other locations where vibration deleteriously effects equipment or passengers.

The magnitude of vibration will also be affected by the regime (airspeed) of the helicopter. For example, there is no flapping motion ($\beta_k$) when the helicopter is on the ground or hovering, thus removing a component of potential vibration. Thus, typical regimes for helicopter might be: Ground, Hover, 90, 120 and 150 knots.

The maintenance procedure to reduce maximum difference in blade track height (track split) and vibration is called Rotor Track and Balance (RTB). Further information regarding RTB is described in the following publications and patents: Bechhoefer, E., Fang, A., "Rotor Track and Balance Improvements", Conference of the Prognostics and Health Management Society, 2013; Bechhoefer, E., Fang, A., Van Ness, D., "Improved Rotor Track and Balance Performance Using an Expert System", IEEE Prognostics Health Management Conference, 2011; Revor, M., Bechhoefer, E., "Rotor Track and Balance Cost Benefit Analysis and Impact on Operational Availability", American Helicopter Society #60, Baltimore, USA, 2004; Bechhoefer, E., Power, D., "HUMS Rotor Track and Balance Techniques", IEEE Aerospace Conference, Big Sky, 2003; Bechhoefer, Eric Robert (New Haven, Vt.); "Reducing vibration using QR decomposition and constrained optimization", Jun. 3, 2003 U.S. Pat. No. 6,574,572; Bechhoefer, Eric Robert (New Haven, Vt.), Ventres, Charles Samuel (Winchester, Mass.), "Reducing vibration using QR decomposition and unconstrained optimization" May 20, 2003, U.S. Pat. No. 6,567,757, each of which is incorporated by reference for its discussion of the same.

Various methodologies have been developed to measure blade track height in an automated fashion. For example, optical tracker systems have been developed for determining the position of a rotating body, with an optical sensor system determining both track height and phase information. These systems are relatively large, heavy, and can, under certain flight conditions, e.g., direct sun light or low contrast conditions, produce significant errors. Alternative designs have included microwave sensing systems where the change in antenna impedance is used to calculate blade track weight and phase information. While solving the low contrast situation found with optical tracking systems, these systems produce large track height errors that limit their usefulness.

SUMMARY OF THE DISCLOSURE

In a first exemplary aspect a blade performance monitoring system is disclosed that comprises a rotation monitor capable of generating a zero crossing time a radar tracker configured to capture time domain data and to receive the zero crossing time; and a control unit configured to transmit commands to and receive information from the radar tracker and the rotation monitor, wherein the control unit synchronizes the rotation monitor and the radar tracker, and wherein the radar tracker determines a blade track height and phase based upon the time domain data and the zero crossing time.

In another exemplary aspect a blade performance monitoring system for a helicopter having a rotor blade is disclosed, the system comprising a radar tracker configured to capture time domain data, including at least a track height of the rotor blade; a rotation sensor configured to determine and distribute a zero crossing time, the rotation sensor in electronic communication with the radar tracker; and an control unit configured to transmit commands to and receive information from the radar tracker; wherein the control unit and the radar tracker are electronically coupled via a bus that: supplies power to the radar tracker; provides a communication medium for synchronizing acquisitions and reporting results from the radar tracker; and allows the rotation monitor to send zero crossing times to the radar tracker; wherein the control unit synchronizes the rotation monitor and the radar tracker, and wherein the radar tracker determines a blade track height and phase based upon the time domain data and the zero crossing time.

In yet another exemplary aspect a method for determining helicopter blade performance on a helicopter is disclosed, the method comprising synchronizing a plurality of sensors, including at least one radar tracker and at least one rotation monitor; collecting zero crossing time data with the at least one rotation monitor; collecting time domain data with the at least one radar tracker; generating a validity flag; determining a plurality of condition indicators; and determining whether, based upon the validity flag, a blade track height is reportable.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

A helicopter rotor blade performance system (BPS) of the present disclosure allows for accurate determination of blade track height and blade track phase while reducing size, weight, and complexity of the system. The BPS uses sensing technology that is scalable to adapt to a variety of helicopters and is readily and unobtrusively installed. The BPS includes a bused smart system methodology that can directly measure track height, while phase can be estimated using the time synchronous average of the magnitude or range of the return signal from a radar wave.

According to an embodiment of the present disclosure, a BPS uses a millimeter wave, active radar, bused smart system methodology to directly measure track height, while phase is estimated using the time synchronous average of the magnitude or range of the return signal from a radar wave. The phase information used by the BPS is synchronous to the main rotor blade using a one strike per revolution striker plate, such as a KeyPhasor® (a monitoring apparatus developed by Bently Nevada Corporation), which indicates the phase of blades relative to the position of the striker.

A bused smart system of the BPS allows for significant weight reductions as fewer cables are needed to couple the sensors together. The weight reduction can be as much as 90%, which is important in the aviation environment. A bused smart system additionally allows for a distributed computing environment as each sensor that is coupled to the bused smart system operates independently, recording specific data and reporting condition indicators, e.g., blade track height and phase for each blade. This configuration allows for lower cost/lower power microcontroller(s) in the onboard control unit (OBCU), which coordinates the sensors, marshals all sensor data, and provides for data download at the end of the flight. For a full description of the bused sensor system for light helicopters, see Bechhoefer, E., Augustin, M., Kingsley, M., "Architecture for a Light Helicopter HUMS", AHS Forum 68, 2012, Ft Worth, Tex., which is incorporated by reference for its disclosure of the same.

In an exemplary embodiment of the BPS, the system includes a 24 GHz (world-wide ISM band) radar sensor, such as, but not limited to the Infineon BGT24ATR12 from Infineon Technologies AG of Milpitas, Calif. While other radar technologies can be used, an advantage of the 24 GHz radar over, for example, the 77 GHz radar is that the 24 GHz ISM band has no restricted availability (e.g., is a ISM world-wide band).

In an exemplary embodiment, each radar sensor (also referred to herein as "tracker" or "radar tracker") contains a radar chip and antenna, with the radar chip being in communication with a low jitter clock, microcontroller, RAM, and a communication receiver/transmitter, such as RS-485 or CAN bus. An OBCU coordinates sampling from each radar sensor and can be configured to control the acquisition of data from vibration sensors, aircraft state parameter sensors (air speed, torque, etc.) and at least one rotation monitor, such as, but not limited to, a tachometer sensor or keyphasor.

Figure 2:
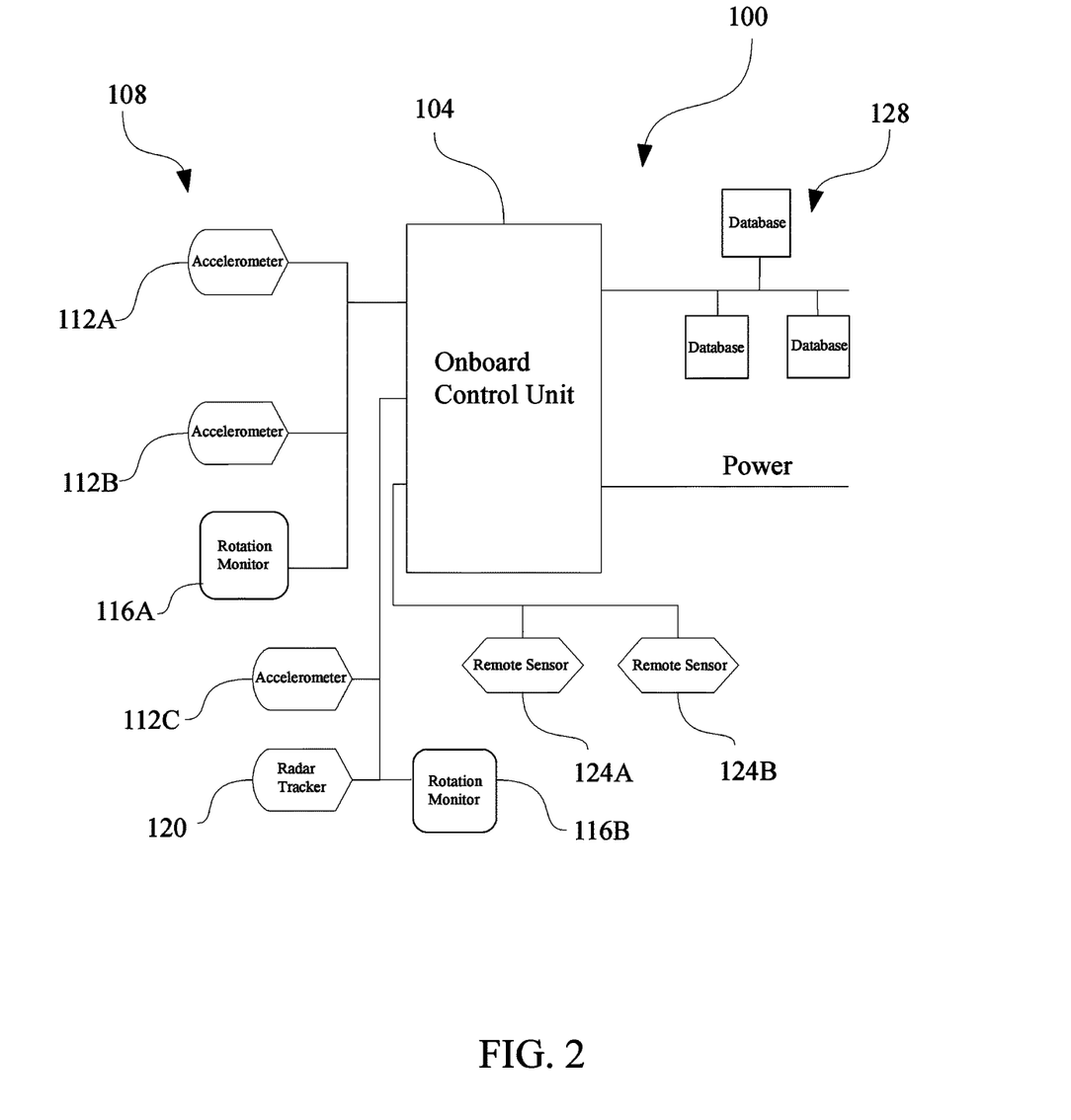
FIG. 2 is a block diagram of a blade performance system (BPS) according to an embodiment of the present invention.

An exemplary embodiment of a BPS 100 including an OBCU 104 and multiple sensors 108 is shown in FIG. 2. OBCU 104, as mentioned above, coordinates the sensors, marshals all sensor data, and provides for data download at the end of the flight. In the embodiment shown in FIG. 2, OBCU 104 is in communication with multiple sensors 108, such as accelerometers 112 (e.g., 112A, 112B, and 112C); a rotation monitor 116 (e.g., 116A and 116B) (e.g., tachometer, keyphasor, etc.); radar tracker 120 (more than one may be used), and remote sensors 124 (e,g, 124A and 124B). OBCU 104 outputs the data collected by sensors 108 to one or more databases 128 for later analysis (described more fully below). The number, type, and distribution of sensors 108 can vary according to the type of helicopter employing BPS 100 as well as the monitoring desired (e.g., certain areas of the helicopter, types of monitoring, e.g., accelerometers, torque, vibration, etc.).

Figure 3:
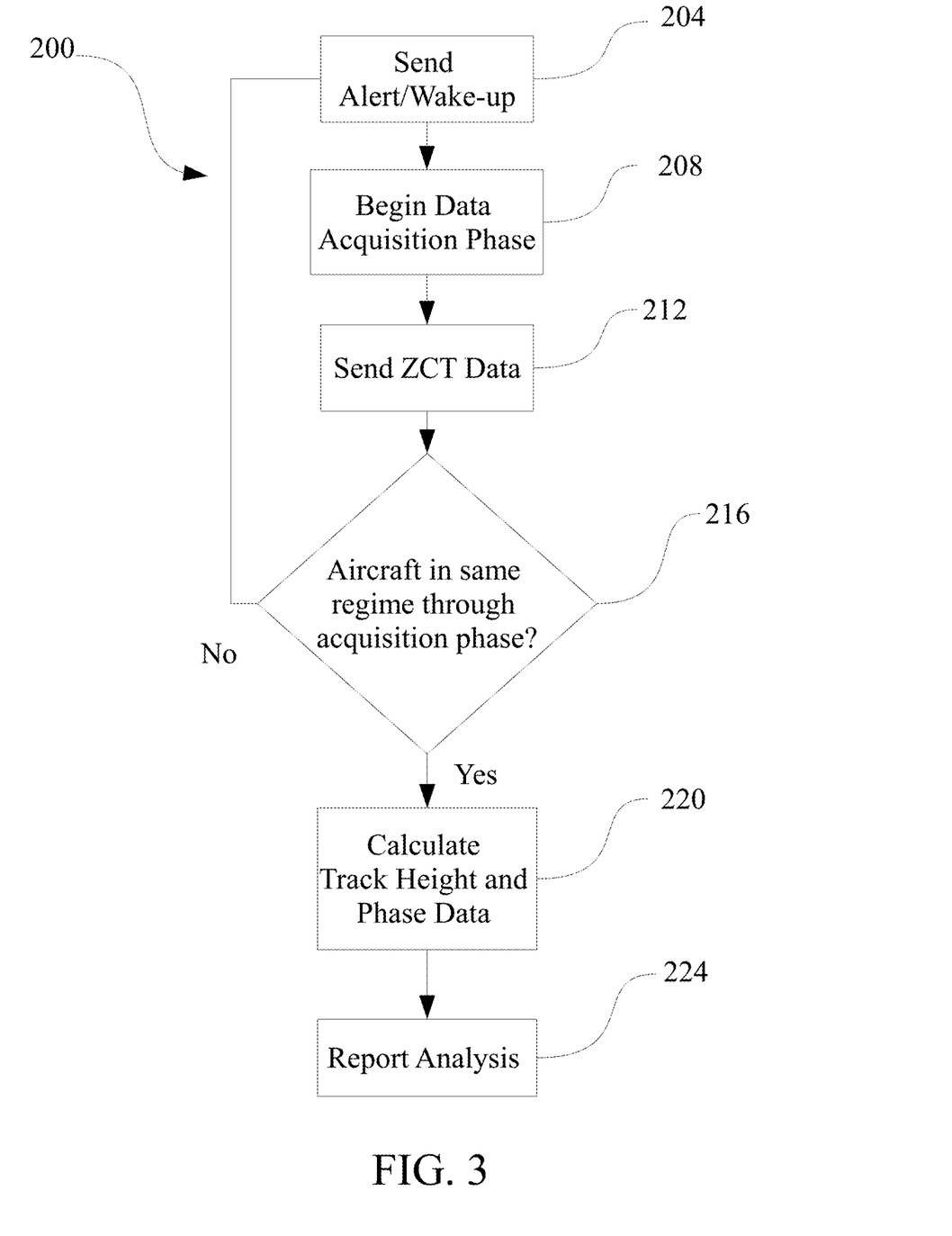
FIG. 3 is a block diagram of an exemplary method of operation of a BPS according to an embodiment of the present invention.

Turning now to FIG. 3 and to a description of exemplary operation 200 of a BPS, such as BPS 100 (FIG. 2) with an OBCU, such as OBCU 104 (FIG. 2), as described herein, when the aircraft is in a predetermined regime.

At step 204 the OBCU sends an alert/wakeup command to the sensors, such as sensors 108. In a preferred embodiment, OBCU sends the wakeup command to time synchronize all radar sensors and at least one tachometer sensor.

At step 208, the sensors begin the data acquisition phase. The configuration of the radar sensors and other sensors, described herein, allows each sensor to acquire the appropriate type and amount of data, indicates type of analysis/calculations to perform, and obtains parametric data needed for analysis, such as, but not limited to, the number of blades and the sample rate.

At end of the data acquisition phase (the length of the data acquisition phase being predetermined, e.g., defined in the OBCU configuration), at step 212, a rotation monitor, such as tachometer sensor 116A (FIG. 2), is directed to provide its keyphasor zero crossing times (ZCT) of the main rotor to at least one of the radar sensors, such as radar sensor 120A (FIG. 2).

The process then moves to step 216, where the process determines whether the regime changed during the data acquisition phase. In the event that the aircraft leaves the predefined regime prior the end of the data acquisition phase, the acquisition is flagged as bad, the data is discarded, and the process returns to step 204. If the aircraft did not leave the regime during the acquisition period, the process proceeds to step 220. In an exemplary embodiment, the radar sensor indicates whether or not the regime changed during the acquisition period and produces a validity flag that represents the change.

At step 220, a radar sensor, having time domain data (e.g., magnitude, and range vs. time), coupled with the ZCT data, can synchronously average the raw magnitude and range data so that an accurate estimate of blade track height and phase can be provided. While all measurements are inherently noisy, time synchronous averaging (TSA) can reduce the measurement noise by 1/sqrt(revolutions) of the radar sensor. For example, a typical acquisition on a 4 Hz main rotor may be 6 seconds, or 24 revolutions. In exemplary embodiment, the radar sensor can use time domain, measured track and magnitude data, along with the zero crossing time data to calculate each blade height and phase relative to the keyphasor.

After determining the blade track height and blade lead/lag, e.g., phase measurements, at step 224 each sensor can report its analysis. In an exemplary embodiment, the radar sensor reports the track height and phase data from its TSA of track/magnitude when the OBCU queries the radar sensor. In another exemplary embodiment, the radar sensor, when commanded by the OBCU, reports the track height and phase data. In yet another exemplary embodiment, the radar sensor, when commanded by the OBCU, has the option of reporting the raw measurement data. In a further exemplary embodiment, the radar sensor can report the validity of its measurements using a built in testing mechanism.

The sensor report can be binary, or in a text based format, such as XML or other forms known in the art. A radar sensor report would have a time (e.g., GMT) of the acquisition, the identity of the radar sensor (there could be more than 1 radar sensor), a validity flag, and the measurements. An exemplary report could be:

```
<comp code='trk1' valid='0' cnt='9'><ci i='1' v='10.1103'/><ci i='2'
v='10.6355'/><ci i='3' v='-2.6653'/><ci i='4' v='-18.0805'/><ci i='5'
v='0.0 '/><ci i='6' v='0.0 '/><ci i='7' v='0.0 '/><ci i='9'
v='1'/></comp>
```

In this embodiment, the component, e.g., radar sensor, "trk1", reported 8 condition indicators (CI). CI 1 through 4 represent the blade track height. CI 5 through 8 represent blade lead/lag (e.g., phase measurements). CI 9 is the regime index, which simplifies the process of comparing data after blade adjustments. For example, when a blade adjustment is made, the blade track data, reported by the radar sensor, from similar regimes can be readily compared, by, for example, using the RTB process described above and incorporated herein.

Figure 4:
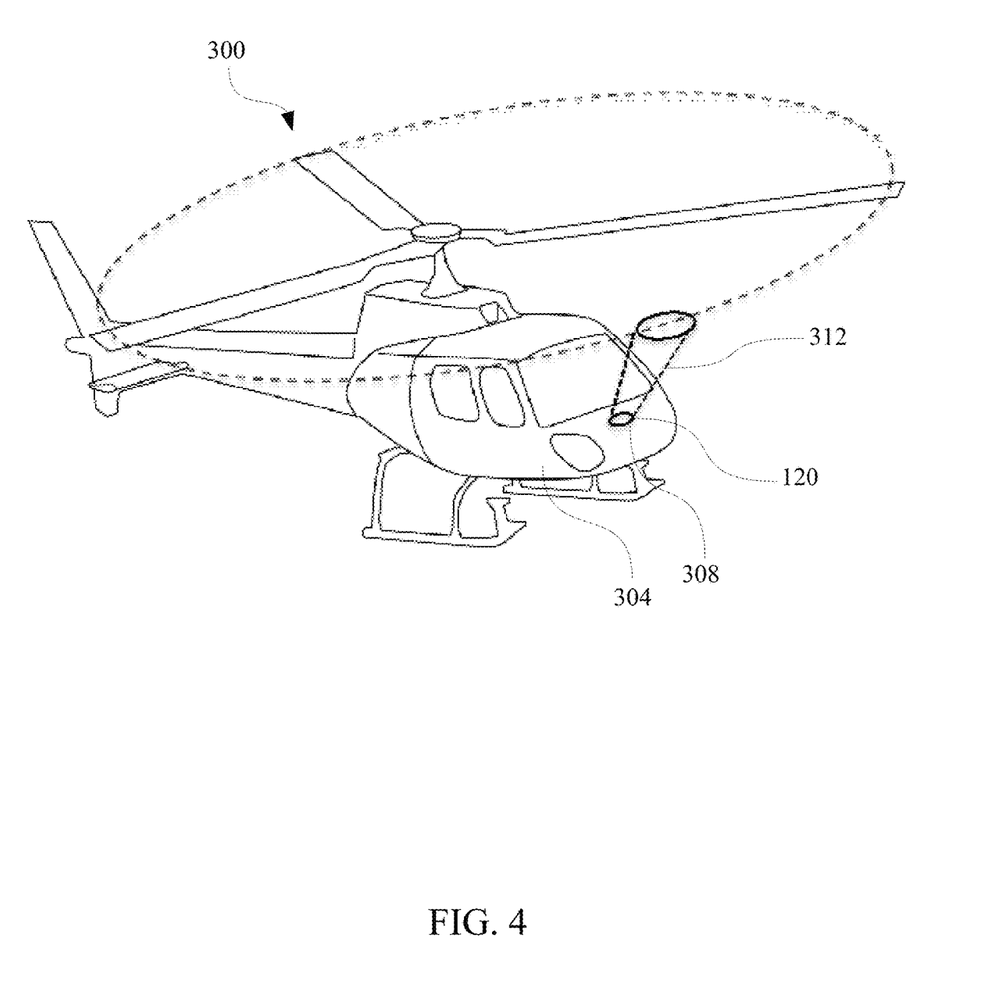
FIG. 4 is an illustration of a BPS installed on a helicopter according to an embodiment of the present invention.

Turning now to FIG. 4, there is shown an illustration of a helicopter 300 suitable for use with a BPS, such as BPS 100. In this embodiment, a radar sensor, such as sensor 120, can be mounted, either permanently or temporarily, on a fuselage 304 of helicopter 300. In an exemplary embodiment, sensor 120 is mounted on a nose 308 of helicopter 300, with the antenna position to measure the blade tip on the centerline of the aircraft. In another embodiment, radar sensor 120 may be mounted on the tail boom (pointing up at the rotor blades) or for a dual rotor aircraft (CH-47, etc.) on the fuselage between both rotors. The radar sensor 120 can be positioned such that it measures the blade tip height (projection 312 shown in FIG. 4). The area of measurement available to radar sensor 120 is a function of the radar sensor wavelength (c/24 GHz=1.25 cm) and the antenna aperture (example, 10 cm), which would give a beam width of about 0.12 radian or 7 degrees.

Figure 5A:
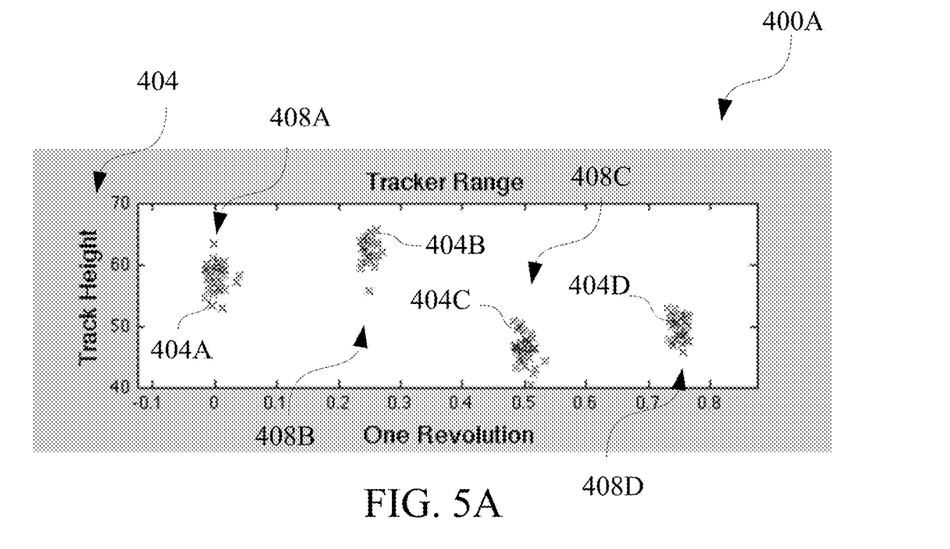
FIGS. 5A-B are charts showing range (5A) and magnitude (5B) for a four blade helicopter according to an embodiment of the present invention.
Figure 5B:
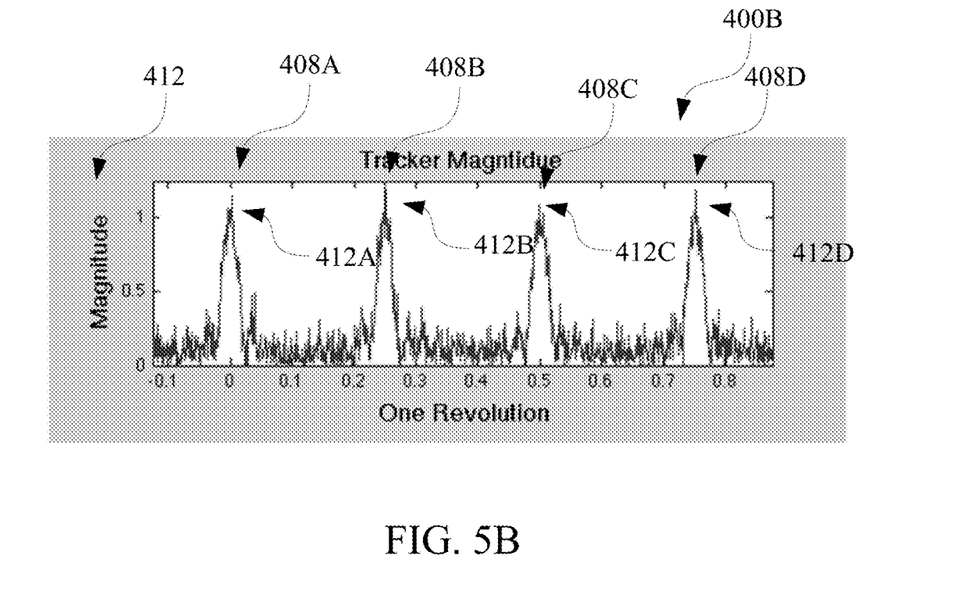
Figure 6A:
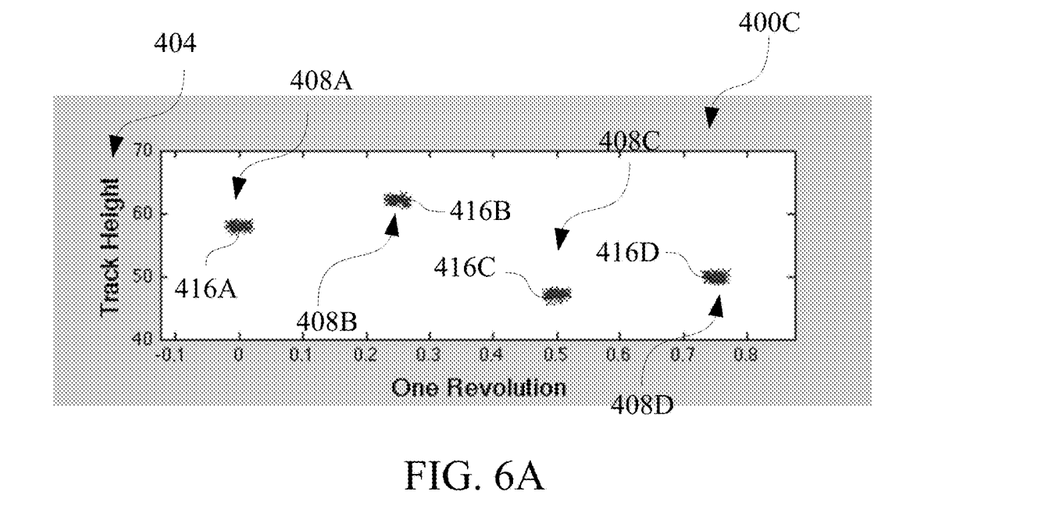
FIGS. 6A-B are charts showing the synchronous average of the range (6A) and magnitude (6B) for a four blade helicopter according to an embodiment of the present invention.
Figure 6B:
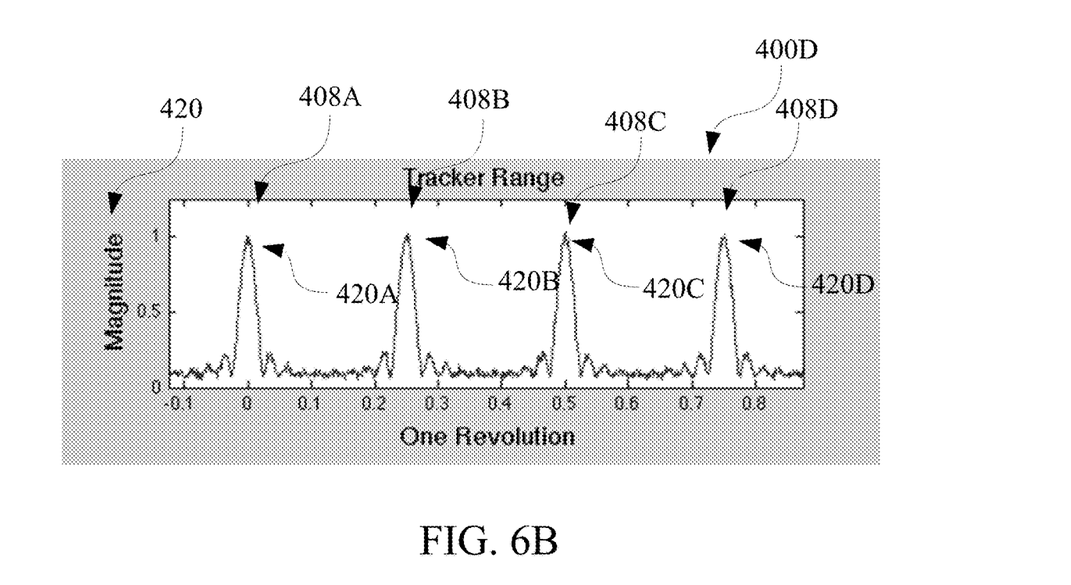

With reference now to FIGS. 5A-B and 6A-B, for each revolution of a rotor blade, radar sensor 120 measures blade height (range) and magnitude. FIGS. 5A-B show the determination of blade height 404 and magnitude 412 at an acquisition period of 6 seconds, whereas FIGS. 6A-6B show the time synchronous average of blade height 416 and magnitude 420. Accordingly, FIG. 5A shows track height 404 (track heights 404A-D) per revolution for each respective blade 408 (in this example there are four blades, therefore blades 408A-D). FIG. 5B shows the magnitude 412 (e.g., magnitudes 412A-D) per revolution for each respective blade 408. FIG. 6A shows time synchronous average track height 416 (track heights 416A-D) per revolution for each respective blade 408 (in this example there are four blades, therefore blades 408A-D). FIG. 6B shows the time synchronous average magnitude 420 (e.g., magnitudes 420A-D) for each respective blade 408.

The keyphasor is used as the reference for the main rotor, usually blade 408A, which allows the determination of the phase of each blade. It should be noted that 1 revolution is 360 degrees. Thus, in this example, the starting point of blade 408A is relative to 0 degrees.

After 24 synchronous averages 404, the time synchronous averaged measured data (FIG. 6A) is: For each blade (4-blade example, blade 408A=rev 0, blade 408B=0.25 rev, blade 408C=rev 0.5 and blade 408D=rev 0.75), the track blade height is average to give heights 416A-D for each respective blade, e.g., blade 408A: 58 mm, blade 408B: 62 mm, blade 408C: 47, blade 408D: 50.

For the phase information, either the maximum magnitude for each blade is used (e.g., magnitudes 420A-D), or the mean index of the range can be used. For example, using track data, where idx is the index values for the measured track and there are 250 samples per revolution (a sampling rate of 1000 samples per second, for a 4 Hz Rotor), the track index for blade 408A is 28:35, the mean value being −0.0029 Rev or −1.036 degrees. Similarly, for blade 408B: mean(rev(idx blade 408B))*360−90=−0.0556 degrees;

for blade 408C: mean(rev(idx blade 408C))*360−180=−0.1210; and for blade 408D: mean(rev(idx blade 408D))*360−270=0.13.

For magnitude, the maximum energy is assumed to be the center of the blade (as the angle of blade attack is small, the blade is assumed to be perpendicular to the plane of the radar). The maximum index for blade 408A is 31, or −0.0049 Rev, or −1.7568 degrees phase. Similarly, for blade 408B: max (rev(idx blade 408B))*360−90=−0.0756 degrees;

for blade 408C: max max (rev(idx blade 408C))*360−180=−0.2210 degrees; and for blade 408D: mean(rev(idx blade 408D))*360−270=0.08 degrees.

As noted previously, using the TAS reduces the measurement noise by 1/sqrt(revolution). Thus, for example, increasing the acquisition time from 6 to 12 seconds would reduce the noise 1/sqrt(2) over the 6 second acquisition.

In this example, the error is small relative to the blade lead/lag, and as such, performance of this exemplary helicopter is acceptable.

As noted above, radar sensor 120 can use a patch antenna of various dimensions, for example, 10 cm×10 cm. The antenna can be conformal such that it is easy to mount and does not present any obstruction to the fuselage, such as fuselage 304. Radar sensor 120 will be packaged to aviation standards to meet DO-160 for environmental conditions, such that it may be permanently installed on the aircraft. A permanent installation of radar sensor 120 saves maintenance time as there is no need to install the equipment for a RTB tracker event/test and then to remove it thereafter.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A blade performance monitoring system comprising:
   a rotation monitor capable of generating a zero crossing time;
   a radar tracker configured to capture time domain data and to receive said zero crossing time; and
   a control unit configured to transmit commands to and receive information from said radar tracker and said rotation monitor,
      wherein said control unit synchronizes said rotation monitor and said radar tracker, and
      wherein said radar tracker determines a blade track height and phase based upon said time domain data and said zero crossing time.

2. A blade performance monitoring system according to claim 1, wherein said rotation monitor is a keyphasor.

3. A blade performance monitoring system according to claim 1, wherein said rotation monitor is a tachometer.

4. A blade performance monitoring system according to claim 1, wherein said time domain data includes at least a magnitude and a range.

5. A blade performance monitoring system according to claim 4, wherein said radar tracker time synchronously averages said magnitude and said range.

6. A blade performance monitoring system according to claim 1, wherein said time domain data includes a time domain, a measured track, and a magnitude, and wherein said radar tracker determines, based upon said time domain, said measured track, said magnitude, and said zero crossing time, a blade height and a phase.

7. A blade performance monitoring system according to claim 1, wherein said radar tracker is configured to determine whether said time domain data is captured in a predetermined regime.

8. A blade performance monitoring system according to claim 7, wherein said radar tracker produces an output that includes a regime index.

9. A blade performance monitoring system according to claim 1, wherein said radar tracker is installed on a fuselage.

10. A blade performance monitoring system for a helicopter having a rotor blade, the system comprising:
    a radar tracker configured to capture time domain data, including at least a track height of the rotor blade;
    a rotation sensor configured to determine and distribute a zero crossing time, said rotation sensor in electronic communication with said radar tracker; and
    a control unit configured to transmit commands to and receive information from said radar tracker; wherein said control unit and said radar tracker are electronically coupled via a bus that:
       supplies power to said radar tracker;
       provides a communication medium for synchronizing acquisitions and reporting results from said radar tracker; and
       allows said rotation monitor to send zero crossing times to said radar tracker;
    wherein said control unit synchronizes said rotation monitor and said radar tracker, and
    wherein said radar tracker determines a blade track height and phase based upon said time domain data and said zero crossing time.

11. A blade performance monitoring system according to 10, wherein said radar tracker uses millimeter wave radar to capture said time domain data.

12. A blade performance monitoring system according to claim 10, wherein said radar tracker time synchronously averages a magnitude or range of a return signal from a radar wave.

13. A blade performance monitoring system according to claim 10, wherein said time domain data further includes a time domain and a magnitude, and wherein said radar tracker determines, based upon said time domain, said track height, said magnitude, and said zero crossing time, a blade height and a phase.

14. A blade performance monitoring system according to claim 10, wherein said radar tracker is configured to determine whether said time domain data is captured in a predetermined regime.

15. A blade performance monitoring system according to claim 14, wherein said radar tracker produces an output that includes a regime index.

16. A blade performance monitoring system according to claim 10, wherein said bus is a smart bus system.

17. A method for determining helicopter blade performance on a helicopter comprising:
- synchronizing a plurality of sensors, including at least one radar tracker and at least one rotation monitor;
- collecting zero crossing time data with the at least one rotation monitor;
- collecting time domain data with the at least one radar tracker;
- generating a validity flag;
- determining a plurality of condition indicators; and
- determining whether, based upon the validity flag, a blade track height is reportable.

18. A method according to claim 17, wherein said collecting zero crossing time data and said collecting time domain data occur during an acquisition period.

19. A method according to claim 18, wherein said generating is determined by evaluating whether the helicopter left a predetermined regime prior to the end of the acquisition period.

20. A method according to claim 17, wherein the plurality of condition indicators further includes a regime indicator, a blade track height, and a phase measurement.

* * * * *